May 12, 1931.    L. D. BARNER ET AL    1,804,585

LINE CHANGING REEL.

Filed Oct. 17, 1928

Inventors
Laurence D Barner
Gus. Otto Shelander

By
Hardway Mather
Attorneys

Patented May 12, 1931

1,804,585

UNITED STATES PATENT OFFICE

LAWRENCE D. BARNER AND GUS OTTO SHELANDER, OF BEAUMONT, TEXAS

LINE CHANGING REEL

Application filed October 17, 1928. Serial No. 313,119.

This invention relates to new and useful improvements in a line changing reel.

One object of the invention is to provide a device of the character described specially designed for use in handling wire lines and cables and which is of such construction that the spool on which the cable is wound may be quickly and easily demounted and another spool mounted in its place when it becomes necessary to change the lines or cables to be used.

Another object of the invention is to provide a novel type of line changing reel specially adapted for use in well drilling operations and which is of very simple construction and may be cheaply and easily produced and which at the same time is very efficient in use. With the above and other objects in view this invention has particular relation to certain novel features of construction, operation and arrangement of parts, an example of which is given in this specification and illustrated in the accompanying drawings, wherein.

Figure 1:
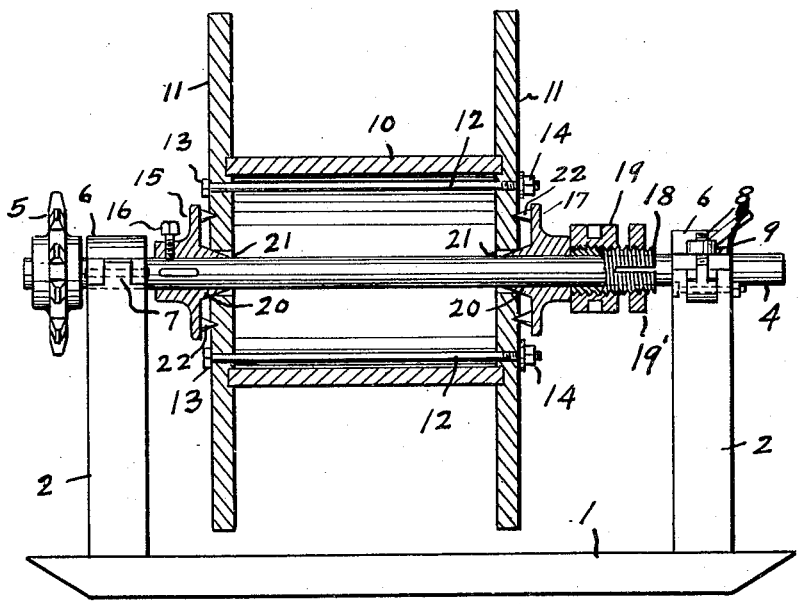
Figure 1 shows a longitudinal sectional view of the device.
Figure 2:
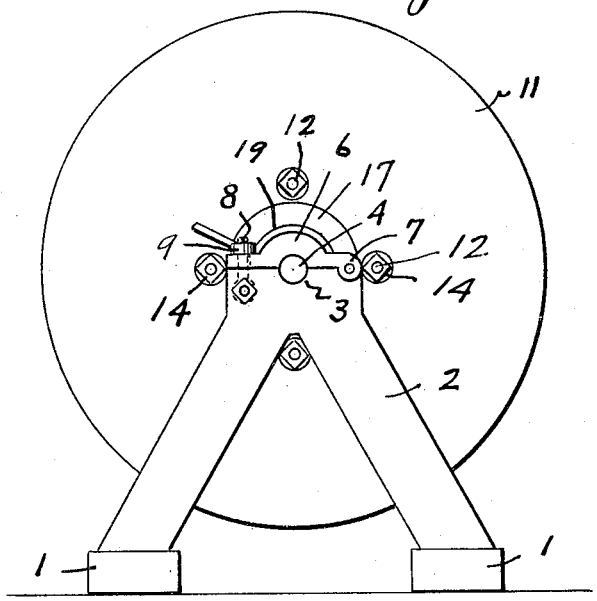
Figure 2 shows an end view thereof.

Referring now more particularly to the drawings, wherein like numerals designate similar parts in each of the figures the numerals 1, 1, designate the base supports which are spaced apart and the numerals 2, 2, designate the A-frames mounted on said supports and spaced apart. On these respective A-frames are the bearings as 3 in which the main shaft 4 is mounted and fixed on one end of the shaft there is a sprocket wheel 5 over which a sprocket chain (not shown) operates, said chain being driven from the line shaft of the ordinary draw works. The bearings 3 include the caps 6, 6, each of which is hingedly mounted at one side as at 7 and is provided at the other side with an upstanding bolt as 8 which extends through said cap and is provided with a quick release nut 9. By releasing the nuts 9 the caps 6 may be thrown back to permit the removal of the shaft 4. There is a spool which includes the drum 10 and the circular ends 11, 11, in which the respective ends of the drum 10 are journaled and the drum 10 and ends 11 are held in assembled relation by means of the usual stay bolts 12, 12 provided at one end with the heads 13 and at the other ends with the nuts 14, which abut the respective ends 11.

Splined on the shaft 4 there is a clamp flange 15 which is fixed against endwise movement on the shaft by the set screw 16 and spaced from this clamp flange there is another similar clamp flange 17 which is adjustable on the shaft 4. Adjacent the outer end of this flange 17 there is an outwardly threaded bushing 18 whose outer end is split and threaded onto the inner end of this bushing there is a clamp nut 19 and on the outer end thereof there is a lock nut 19'. This outer end is tapered so that when the lock nut is tightened up the bushing will be clamped to the shaft 4, the inner sides of the clamp flanges 16, 17 have the annular tapering bushings 20, 20, formed integrally therewith adapted to fit into the central bearings 21, 21 of the spool ends 11, 11 and the inner sides of said flanges also have the inwardly projecting teeth 22, 22 adapted to engage said spool ends and bite into the same. When it is desired to change spools the caps 6 may be released and the lock nut 19 un-screwed to release the bushing 18. Said bushing with the nuts 19, 19' and the adjacent clamp flange 17 may then be removed and the spool shall thus be released and this spool may then be removed from the shaft and another substituted for it and the clamp flange 17 and bushing 18 with the nuts thereon then replaced. The lock nut 19 may then be screwed up to lock the bushing on the shaft and the clamp nut 19' then screwed up tightly against the outer end of the clamp flange 17 so as to clamp the spool securely between the flange 15, 17. The bearing caps 6 may then be secured in place and the change thus completed.

While we have shown what we now consider to be the preferred form of the invention it is obvious that mechanical changes may be made therein and equivalents substituted for the parts shown and we reserve the right to make such changes and substitutions as may be found desirable within the principle of the invention.

What we claim is:—

1. The combination with a shaft, of a removable spool thereon, end clamps on the shaft adapted to engage the respective ends of said spool and releasable means provided to hold one of said end clamps in engaging relation with the adjacent end of said spool, said releasable means comprising a split bushing on the shaft, a lock nut on the bushing adapted to lock said bushing with the shaft and a clamp nut on the bushing adjustable into abutting relation with the adjacent clamp.

2. The combination with a shaft, of a removable spool thereon, end clamps on the shaft adapted to engage the respective ends of said spool, releasable means provided to hold one of said end clamps in engaging relation with the adjacent end of said spool, said releasable means including a contractable member, means on said member adapted to contract the same about the shaft, and a clamp nut on said member adjustable into abutting relation with the adjacent clamp.

In testimony whereof we have signed our names to this specification.

GUS OTTO SHELANDER.
LAWRENCE D. BARNER.